R. H. O'NEILL.
SCRAPER AND LEVELER.
APPLICATION FILED AUG. 12, 1908.

1,016,228.

Patented Jan. 30, 1912.

Witnesses
G. G. Newstrom
A. T. Anderson

Inventor
R. H. O'Neill.

UNITED STATES PATENT OFFICE.

REX H. O'NEILL, OF CHICAGO, ILLINOIS.

SCRAPER AND LEVELER.

1,016,228. Specification of Letters Patent. Patented Jan. 30, 1912.

Application filed August 12, 1908. Serial No. 448,212.

*To all whom it may concern:*

Be it known that I, REX H. O'NEILL, a citizen of the United States, residing at Chicago, in the county of Cook and State of Illinois, have invented a new and useful Scraper and Leveler for Dirt, Grain, and other Materials, of which the following is a specification.

My invention relates to improvements in scrapers and levelers which operate by pushing the materials along the ground or floor directly ahead of the scraper blade or in an oblique sidewise direction, and the objects of my improvements are, first, to combine great strength, lightness, durability and low cost in a device of great utility in many lines of work; second, to give convenience and ease of operation heretofore unknown; third, to increase the capacity; fourth, to increase the efficiency; fifth, to prevent the sidewise movement which is so objectionable in ordinary drag scrapers. I attain these objects by combining with a scraper blade the following new and useful features hereafter described and shown, namely: forwardly extending end parts attached to and supporting the scraper blade in operative position and increasing its capacity; the inward and upward inclination of these end parts; the construction of a tongueless scraper having the hitching point located ahead of the scraping blade and cutting edge; means by which the amount of material moved and released is regulated by the operator shifting his weight while riding on the apparatus; mechanism for dumping the scraper and returning it immediately to the scraping position without stopping and with very little effort on the part of the operator; and means for preventing the very objectionable sidewise movement to which ordinary wide drag scrapers and levelers are subject.

Figure 1:
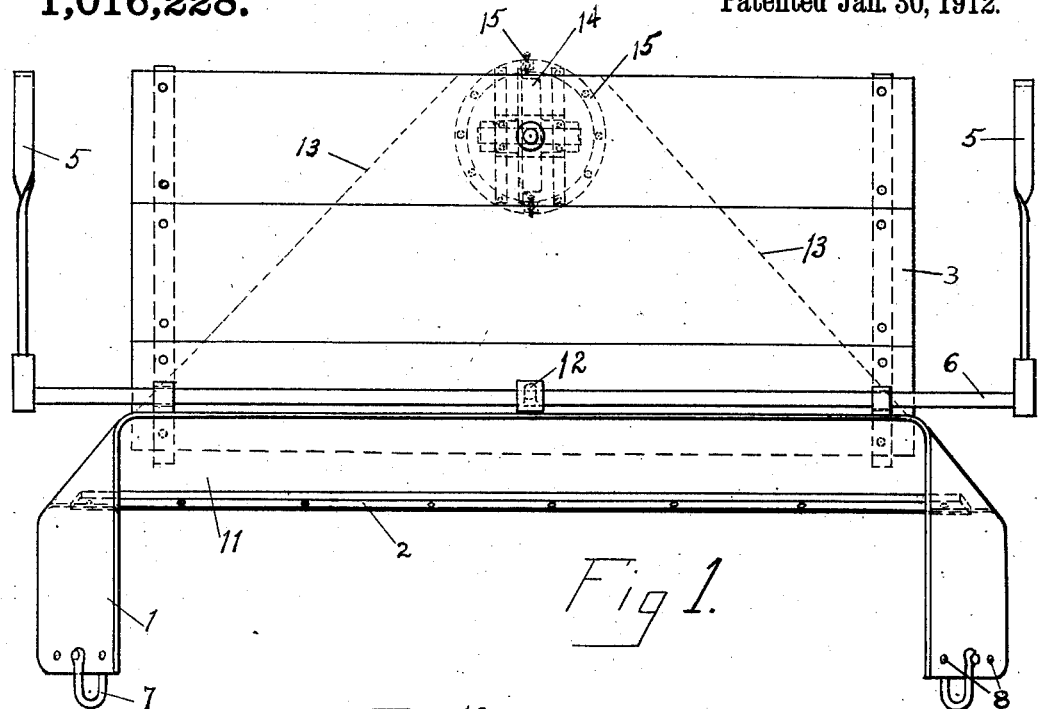
Figure 2:
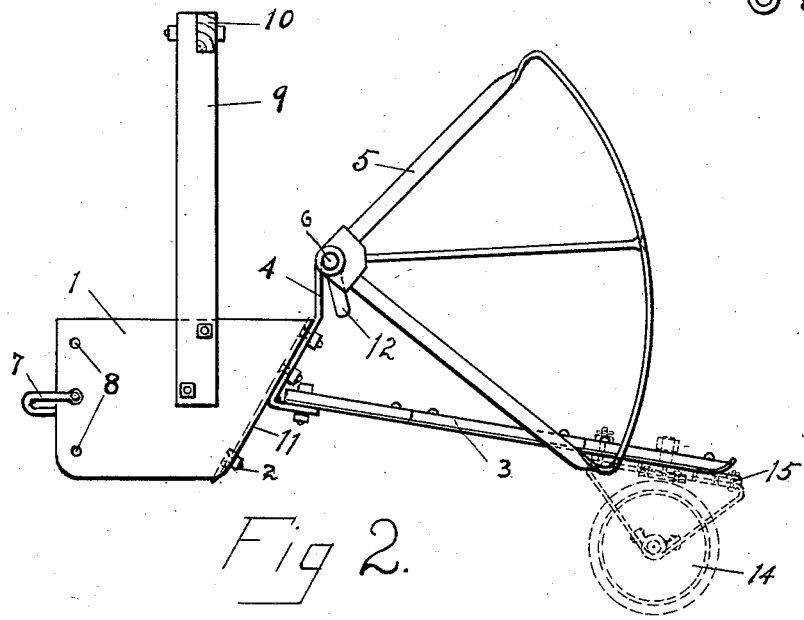

In the accompanying drawing Figure 1 shows a plan view of the scraper and leveler and Fig. 2 shows an end view, like numerals referring to the same parts in each view.

As shown, the scraper blade 11, and the two end parts 1, are formed by bending a sheet of iron obliquely crosswise giving it the form shown. Holes 8, are placed in the ends 1, to allow adjustment of the clevises 7, by which the scraper and leveler is drawn. A cutting bar 2, is attached to the lower edge of the scraper blade 11, on the front side, lessening the liability of the scraper blade to bend out of shape. When additional stiffness is required, a bar of angle iron may be fastened on the back side of the scraper blade near the bottom edge. Attached to the back side of the scraper blade 11, is a platform 3, on which the operator may ride. The rear end of the platform drags on the ground and by stepping to different parts of the platform, the operator may cause the scraper blade to dig into the dirt or to allow some of the dirt already gathered in front of the blade to escape underneath it, or to escape at one end of the scraper blade while the other end is forced deeper into the dirt.

It is evident that when the rear end of the platform 3, is provided with a wheel or roller as indicated by dotted lines, that it will operate in the same manner and have a greater resistance to side motions.

Brackets 4, extending above the scraper blade 11, from its back side, support a rotatable shaft 6, at each end of which is attached a wheel segment 5, which, when thrown over forward will engage the ground and lift the scraper blade as the latter is moved forward, allowing the dirt to fall out, after which the scraper blade falls into the scraping position again. A single spoke may replace the wheel segment 5, but the latter, being constructed on the plan of an eccentric, will lift the scraper blade higher and hold it up longer.

The upright standards 9, and the hand rail 10, are not shown in Fig. 1 and are intended as a support which the operator may grasp to steady himself, and as a handle for carrying and holding the scraper when used to unload grain cars, etc. Several persons may stand on the platform 3, when scraping hard materials and weights may be laid on the platform or on top of the scraper blade.

When the scraper and leveler is drawn at an oblique angle and used to push large quantities of materials to one side—as when used to clean snow off of sidewalks, and dragging roads, I prefer the operator's platform shaped as indicated by the dotted lines 13, and supported at the rear end by one or more flanged wheels 14, with means for adjustment 15, to different angles in relation to said platform, as is shown by dotted lines. The front end of the operator's platform would then be attached near the top of the scraper blade.

Wheels, especially flanged wheels, greatly lessen the tendency of the scraper blade to move sidewise when being drawn in an oblique position, and by adjusting the wheel or wheels, it or they, may be caused to give a sidewise pressure to counteract, to a considerable extent, the sidewise pressure of the materials against the scraper blade.

It is evident that one or more wheels or rollers may be attached directly to the scraper blade and that it or they may slide in a vertical slot or slots or be attached by means of a flexible spring instead of with a hinged connection as shown.

When used to push large quantities of materials to one side, I prefer that the end parts 1, be hinged to the scraper blade 11, so that either one of the end parts 1, could be swung back behind the scraper blade 11, and the chain or other pulling means could be attached at the top of the scraper blade at that end, or a bent bar could be attached to the back of the scraper blade at that end and extend over forward making a hitching point, and if desired, its end may be supported from the ground.

For some work, a plain scraper blade sharpened on its lower edge and on both ends, when used in connection with a tongue or shafts attached to its back side and extending forward over it, together with one or more wheels or rollers attached as herein described, would be most efficient and said tongue may be made adjustable with regard to the relative vertical and horizontal angles between it and said scraper blade. The short hand-lever 12, is for use in throwing the segments 5, over forward to dump the scraper.

The various attachments shown will be used or not according to the demands of the various kinds of work to which this scraper and leveler is adapted; for instance, in scraping grain out of box cars, the flanged wheel, platform, and dumping attachments will all be discarded and by forming the scraper with vertical ends and back it will scrape more of the grain from the corners and ends of the cars.

When dragging roads, a cutter bar 2, can be used which conforms to the rounded shape of the road, and, as the scraper blade is drawn obliquely and pushes a quantity of dirt in front of it, the dirt will press upward against the rearward inwardly inclined end of the scraper and leveler, lifting that end of the scraper blade and distributing a portion of dirt upon the road leaving the greatest amount at the middle of the road and a diminishing quantity toward the ditch instead of piling all the dirt in the middle of the road as is the case with ordinary road drags. Any overhanging structure on the front side of the scraper blade to receive the upward pressure of the dirt and lift the scraper blade will give a like result when the dirt is prevented from escaping around the rearward end of the scraper blade. When this scraper blade strikes an obstruction, it has a tendency to swing upward and slip over the obstruction instead of turning bottom side up as do scrapers which are pulled from points located backward from the cutting edge. The dragging platform 3, does much to prevent the scraper blade from jumping sidewise when the latter strikes an obstruction, but the wheels are still more efficient in this respect.

I claim:

1. A scraper and leveler of the class described, the principal portions of which are formed by bending one or both ends of a rectangular sheet of metal along lines oblique to each other, and oblique to the sides and ends of the said rectangular sheet in such manner that when the sheet is set on its edge after bending, the central portion of it will slant upward and backward, and one or both of the end portions will extend forward, and slant inward and upward, and means by which it may be operatively drawn, in this position.

2. A scraper and leveler comprising a scraper blade, one or both ends of which extend forward and support said blade in operative position, and form connections by means of which the scraper and leveler is drawn, and an operator's platform the front end of which is pivotally attached to the rear side of said blade, and its rear end being supported by the ground, substantially as shown and described.

3. In a scraper and leveler, the combination of a scraper blade, means by which it may be drawn in an oblique position allowing dirt and other materials to move toward its rearmost end, an end member attached to the rearmost end of said scraper blade and extending in a forward direction from it, such end member being inclined sidewise in an upward and inward direction causing the pressure of the material being moved, to exert a lifting pressure upon said end member.

4. In a scraper and leveler, the combination of a scraping blade, means for supporting it in operative position, an operator's platform pivotally attached to the rear side of said scraping blade, a rotatable dumping member, or members, attached to said blade and adapted to be rotated by the operator causing the ends of the dumping members to strike the ground at each side and slightly in advance of the scraping blade and raise it from the ground and then allow said blade to again fall into scraping contact with the ground, and means by which the whole may be operatively drawn.

5. In a scraper and leveler for dirt and other materials, the combination of a scraper blade, means for supporting and drawing said blade in operative position, and rotatable members attached to said scraper blade in position to be thrown into contact with the ground at points located forward from their supports and being adapted to engage the ground and lift said scraper blade as the latter is moved forward, and allow it to fall into the scraping position again after it has passed the points of lifting engagement between said rotatable members and the ground.

R. H. O'NEILL.

Witnesses:
A. T. ANDERSON,
G. A. NEWSTROM.

Copies of this patent may be obtained for five cents each, by addressing the "Commissioner of Patents, Washington, D. C."